US011845141B2

United States Patent
Senderos et al.

(10) Patent No.: US 11,845,141 B2
(45) Date of Patent: Dec. 19, 2023

(54) ADDITIVE FRICTION STIR DEPOSITION METHOD FOR MANUFACTURING AN ARTICLE

(71) Applicant: The Boeing Company, Chicago, IL (US)

(72) Inventors: Bruno Zamorano Senderos, Huntsville, AL (US); Rogie I. Rodriguez, Huntsville, AL (US); Ali Yousefiani, Arcadia, CA (US)

(73) Assignee: The Boeing Company, Arlington, VA (US)

( * ) Notice: Subject to any disclaimer, the term of this patent is extended or adjusted under 35 U.S.C. 154(b) by 94 days.

(21) Appl. No.: 16/736,913

(22) Filed: Jan. 8, 2020

(65) Prior Publication Data

US 2021/0205916 A1  Jul. 8, 2021

(51) Int. Cl.
*B23K 20/12* (2006.01)
*B33Y 10/00* (2015.01)
*B33Y 70/00* (2020.01)
*B33Y 80/00* (2015.01)
*F16H 55/06* (2006.01)
*F16H 55/17* (2006.01)
(Continued)

(52) U.S. Cl.
CPC ............ *B23K 20/122* (2013.01); *B22F 10/00* (2021.01); *B22F 10/66* (2021.01); *B23K 20/1215* (2013.01); *B33Y 10/00* (2014.12); *B33Y 70/00* (2014.12); *B33Y 80/00* (2014.12); *F16H 55/06* (2013.01); *F16H 55/17* (2013.01); *B23K 20/128* (2013.01); *B23K 2101/008* (2018.08); *B23K 2103/04* (2018.08); *B23K 2103/10* (2018.08); *B23K 2103/14* (2018.08); *B64F 5/10* (2017.01)

(58) Field of Classification Search
None
See application file for complete search history.

(56) References Cited

U.S. PATENT DOCUMENTS 8,397,974 B2  3/2013  Schultz et al.
8,632,850 B2  1/2014  Schultz et al.
(Continued)

FOREIGN PATENT DOCUMENTS

CN    102170992 A    8/2011
CN    103763984 A    4/2014
(Continued)

OTHER PUBLICATIONS

Yu et al.—"Non-beam based metal additive manufacturing enabled by additive friction stir deposition", Scripta Materialia, 2018, issue 153, p. 122-131 (Year: 2018).*
(Continued)

*Primary Examiner* — Devang R Patel
(74) *Attorney, Agent, or Firm* — Walters & Wasylyna LLC

(57) ABSTRACT

A method is provided for manufacturing an article. The method comprises depositing by additive friction stir deposition a wear-resistant material on a surface of a preform to provide an intermediate article. The preform comprises a first composition and the wear-resistant material comprises a second composition. The second composition is substantially different from the first composition. The method also comprises machining the intermediate article to remove therefrom at least a portion of the wear-resistant material.

19 Claims, 10 Drawing Sheets

(51) Int. Cl.
    *B22F 10/00*     (2021.01)
    *B22F 10/66*     (2021.01)
    *B64F 5/10*     (2017.01)
    *B23K 101/00*     (2006.01)
    *B23K 103/10*     (2006.01)
    *B23K 103/04*     (2006.01)
    *B23K 103/14*     (2006.01)

(56) References Cited

U.S. PATENT DOCUMENTS

| | | | |
|---|---|---|---|
| 8,636,194 B2 | 1/2014 | Schultz et al. | |
| 8,875,976 B2 | 11/2014 | Schultz et al. | |
| 10,442,002 B2 * | 10/2019 | Benthien | B22F 10/20 |
| 2009/0200275 A1 | 8/2009 | Twelves, Jr. et al. | |
| 2014/0369846 A1 | 12/2014 | Berglund | |
| 2018/0085849 A1 | 3/2018 | Kandasamy et al. | |
| 2018/0133790 A1 | 5/2018 | Yahata et al. | |
| 2018/0257141 A1 * | 9/2018 | Hofmann | B23K 15/0086 |
| 2018/0326547 A1 * | 11/2018 | Stadtfeld | B23P 15/14 |
| 2020/0306869 A1 * | 10/2020 | Hardwick | B23K 20/128 |
| 2020/0353671 A1 * | 11/2020 | Wang | B29C 64/118 |

FOREIGN PATENT DOCUMENTS

| | | | | |
|---|---|---|---|---|
| CN | 103981517 A | | 8/2014 | |
| CN | 104864067 B | * | 2/2018 | C23C 24/10 |
| CN | 108374878 A | * | 8/2018 | |
| CN | 108607986 A | | 10/2018 | |
| CN | 109202272 | | 1/2019 | |
| CN | 109202273 A | | 1/2019 | |
| CN | 109706445 A | | 5/2019 | |
| CN | 110049839 A | | 7/2019 | |
| CN | 110605358 A | | 12/2019 | |
| DE | 3820342 A1 | | 12/1989 | |
| DE | 10 2018126718 | | 5/2019 | |
| WO | WO 2017/095785 | | 6/2017 | |
| WO | WO 2018/093667 | | 5/2018 | |
| WO | WO 2019/040509 | | 2/2019 | |
| WO | WO-2019246510 A1 | * | 12/2019 | B22F 10/10 |

OTHER PUBLICATIONS

Ram et al. Mechanical Behaviour of Alumina Silicon Carbide Reinforced Metal Matrix Composite, IOP Conf. Series: Mater. Sci. and Eng., 2017, p. 1-6. (Year: 2017).*
European Patent Office, Extended European Search Report, App. No. 20209368.8 (dated May 31, 2021).
Politis Nicholas: "Forging Lightweight Bimetal Gears," URL: http://spiral.imperial.ac.uk/bitstream/10044/1/69789/3/Politris-N-2017-PhD-Thesis.pdf (Mar. 31, 2017).
European Patent Office, "Communication pursuant to Article 94(3) EPC," App. No. 20 209 368.8 (dated Jun. 30, 2023).
China National Intellectual Properyty Administration, Office Action, with English translation, App. No. 20210009867.3 (dated Sep. 14, 2023).

* cited by examiner

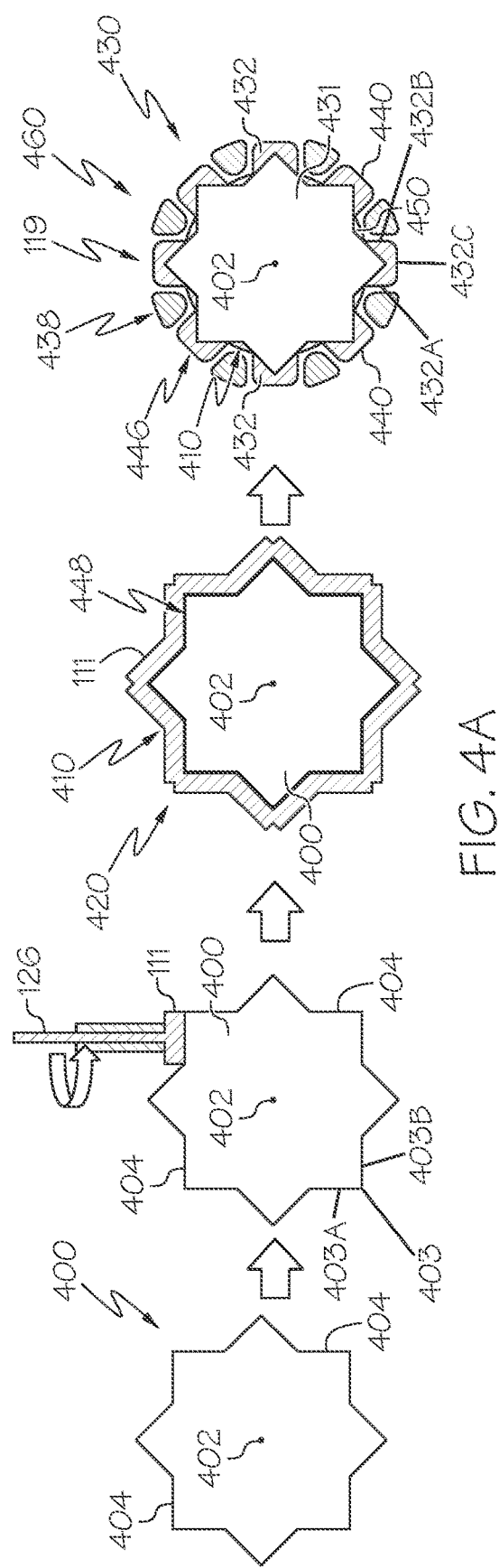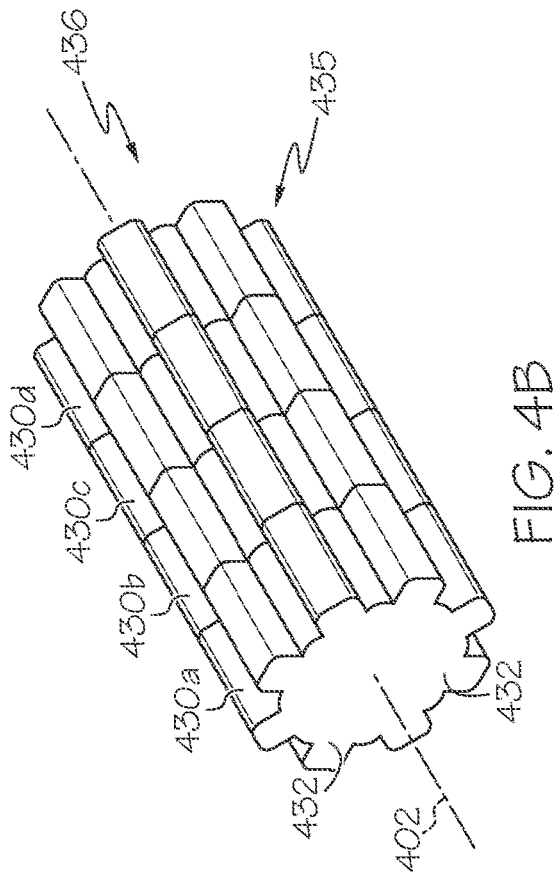
FIG. 4A
FIG. 4B

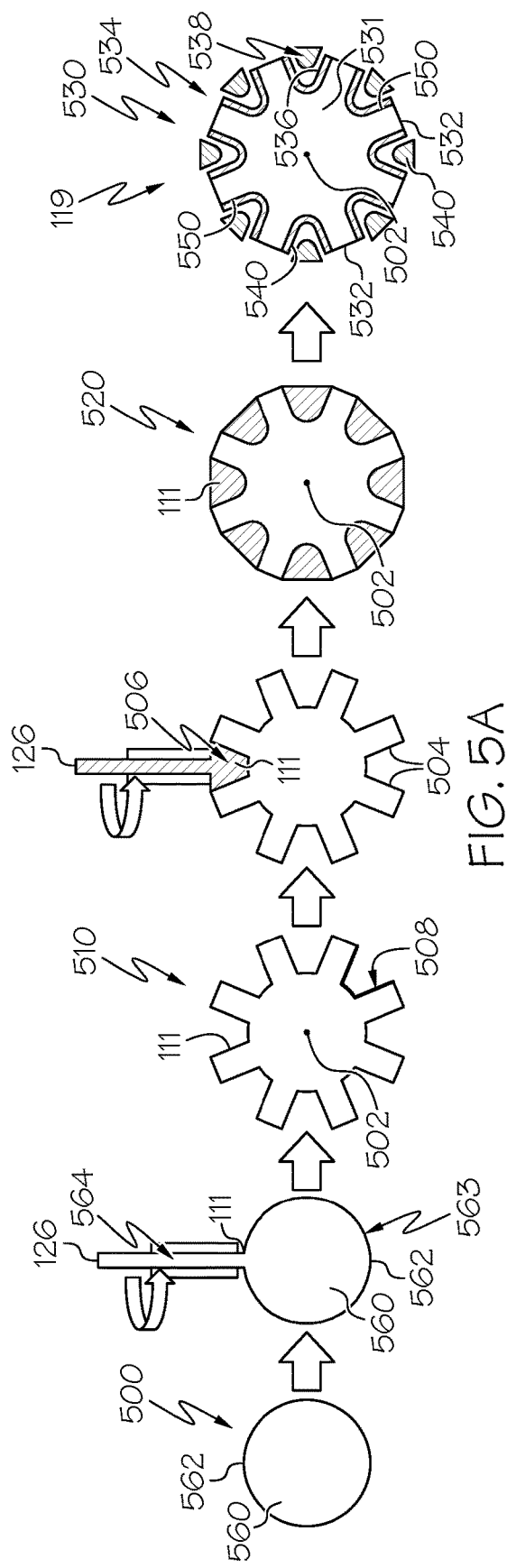
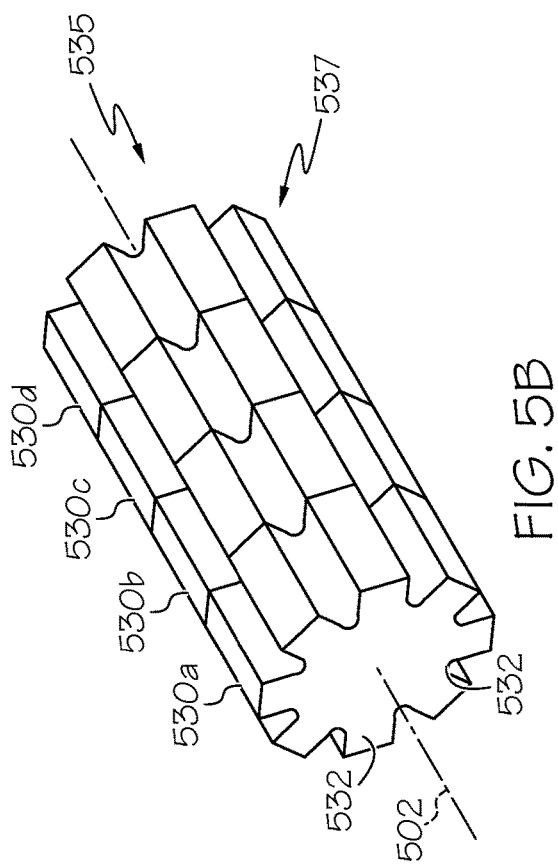
FIG. 5A
FIG. 5B

1

ADDITIVE FRICTION STIR DEPOSITION METHOD FOR MANUFACTURING AN ARTICLE

FIELD

The present disclosure generally relates to additive manufacturing and, more particularly, to an additive friction stir deposition method for manufacturing an article.

BACKGROUND

Articles, made using additive manufacturing techniques, are fabricated by adding material layer by layer. Friction stir additive manufacturing is a solid-state additive manufacturing technique based on friction stir welding. Additive friction stir deposition is a solid-state additive manufacturing technique that combines friction stir welding with a material feeding and deposition process. In additive friction stir deposition, feed material is delivered through a hollow friction stir tool. The friction stir tool rapidly rotates and generates heat through dynamic contact friction at a tool-material interface. Heat is generated by dynamic contact friction between the friction stir tool and a material, dissipated by plastic deformation of the material, and transferred inside the material by thermal conduction. Heated and softened, the feed material is fed through the friction stir tool and bonds with a substrate through plastic deformation at the interface. The additive friction stir deposition method may be used to manufacture articles for a variety of applications.

Despite advances already made, those skilled in the art continue with research and development efforts in the field of additive manufacturing including applying the additive friction stir deposition method to manufacture different types of articles.

SUMMARY

Disclosed is a method for manufacturing an article.

In one example, the disclosed method includes depositing by additive friction stir deposition a wear-resistant material on a surface of a preform to provide an intermediate article. The preform includes a first composition and the wear-resistant material includes a second composition. The second composition is substantially different from the first composition. The method also includes machining the intermediate article to remove therefrom at least a portion of the wear-resistant material.

In another example, the disclosed method is for manufacturing a gear including gear teeth from a preform including a metallic material. The method includes depositing by additive friction stir deposition a metal-matrix composite on the metallic material of the preform to provide an intermediate article. The method also includes machining the intermediate article to remove at least a portion of the metal-matrix composite deposited on the preform.

Also disclosed is an article, such as a gear.

In one example, the disclosed gear includes a gear core including a plurality of gear teeth protruding from the gear core. The gear also includes a wear-resistant layer disposed on at least a portion of each gear tooth of the plurality of gear teeth. The gear further includes an intermixed interface layer defined between the gear core and the wear-resistant layer disposed on the gear core.

Other examples of the disclosed methods and articles will become apparent from the following detailed description, the accompanying drawings and the appended claims.

BRIEF DESCRIPTION OF THE DRAWINGS

FIGS. 4A and 4B are each a schematic, elevational, sectional view of an example article in the form of a gear manufactured using the additive manufacturing system of FIG. 1, according to an example.

FIGS. 5A and 5B are each a schematic, elevational, sectional view of an example article in the form of a gear manufactured using the additive manufacturing system of FIG. 1, according to an example.

DETAILED DESCRIPTION

Reference herein to "example" means that one or more feature, structure, or characteristic described in connection with the example is included in at least one implementation. The phrase "example" in various places in the specification may or may not be referring to the same example.

Figure 1:
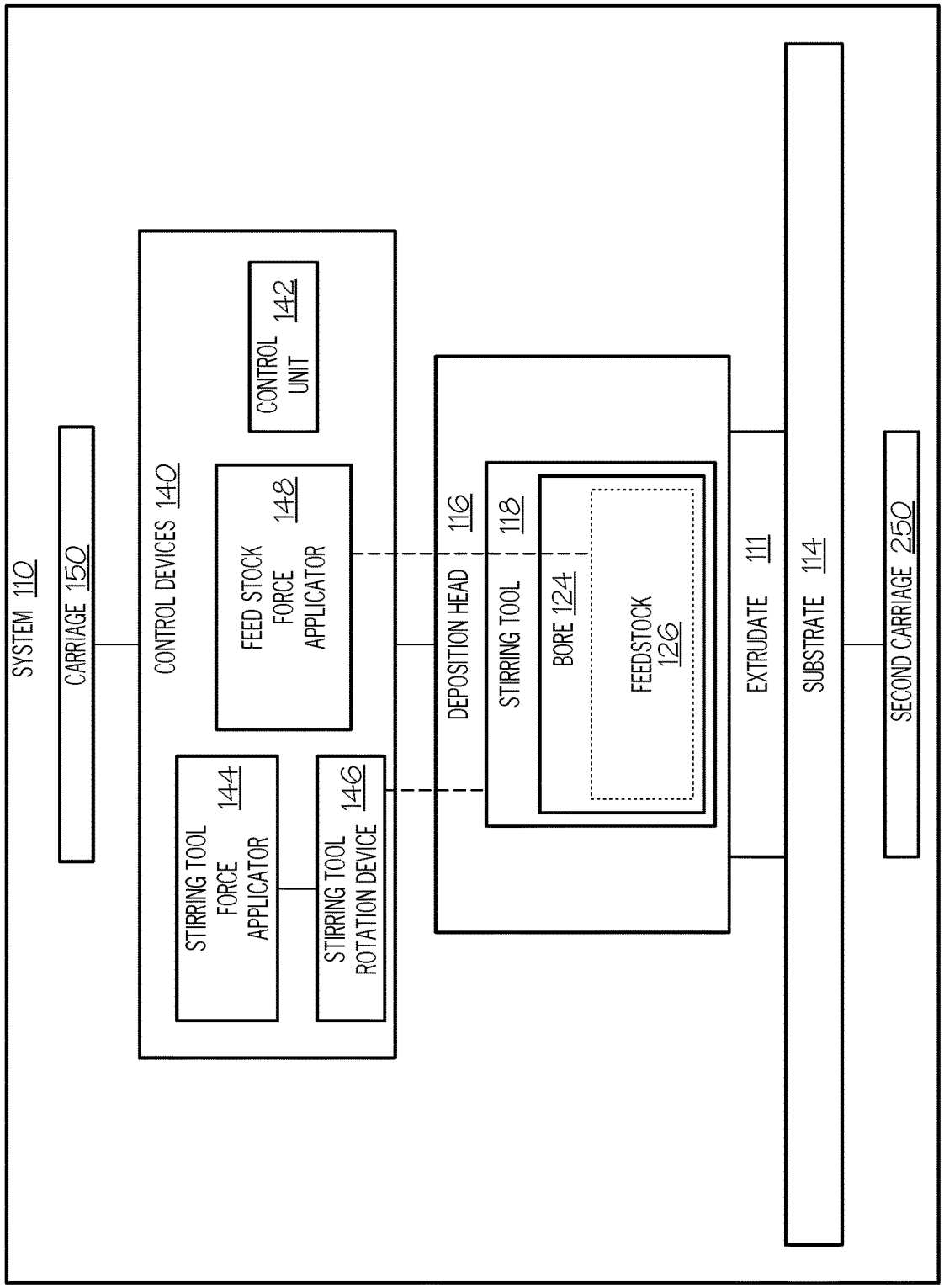
FIG. 1 is a block diagram of an additive manufacturing system for depositing an extrudate onto a substrate, according to an example.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 7:
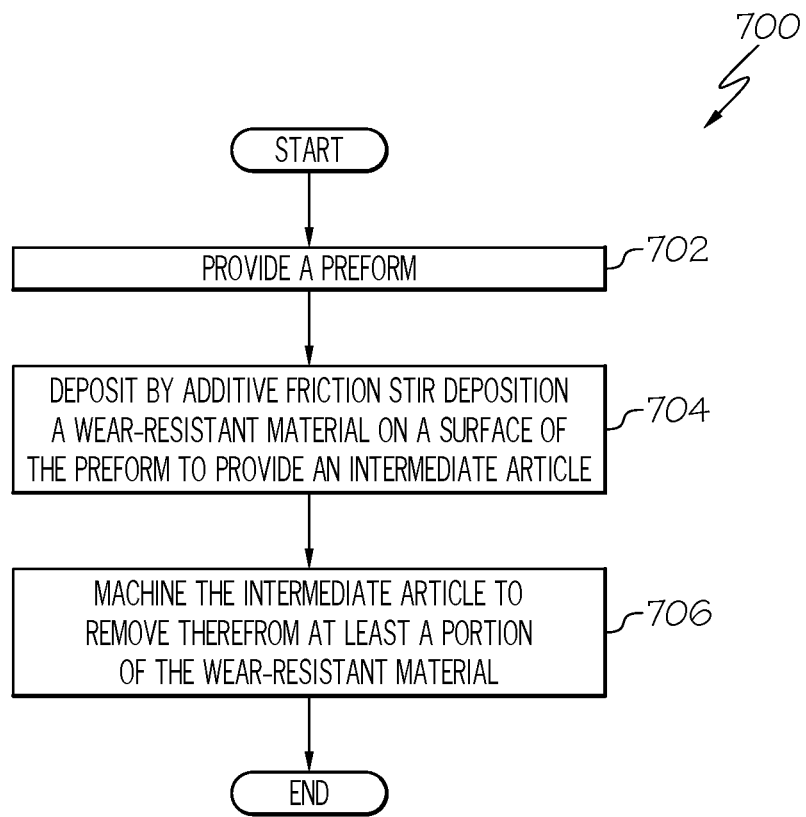
FIG. 7 is a block diagram of a method of depositing an extrudate onto a substrate using the additive manufacturing system of FIG. 1 to manufacture an article, according to an example.
Figure 8:
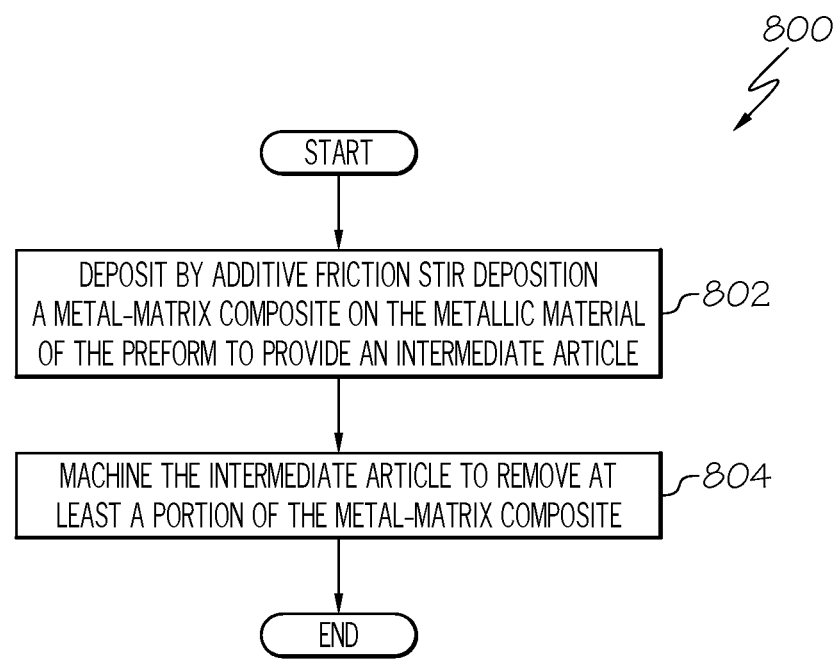
FIG. 8 is a block diagram of a method of depositing an extrudate onto a substrate using the additive manufacturing system of FIG. 1 to manufacture an article, according to an example.
Figure 9:
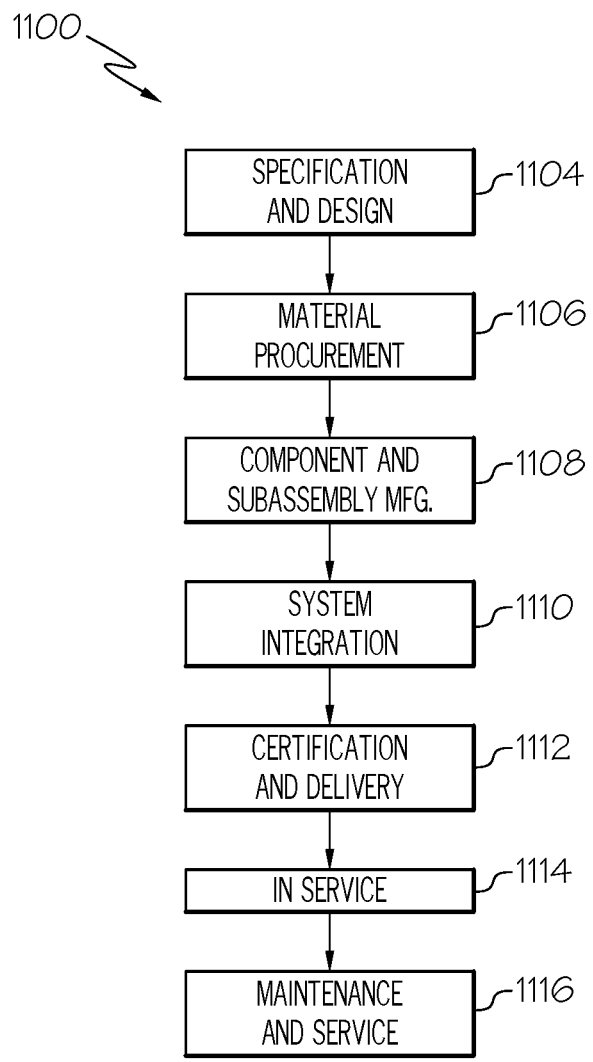
FIG. 9 is a block diagram of aircraft production and service methodology.

In FIGS. 7, 8 and 9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7, 8 and 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

For the purpose of the present disclosure, the term "equivalent" refers to a condition that is exactly identical to the stated condition or a condition that is substantially the same as the stated condition. As used herein, the term "substantially" refers to a condition that is similar to an extent that it may be perceived as being exact. Thus, the phrase "A is equivalent to B" encompasses conditions in which A is exactly the same as B, or where A is within a predetermined allowable variance of (e.g., +/−5%) of B, or vice versa.

Further, as used herein, the term "approximately" refers to a condition that is close to, but not exactly, the stated condition that still performs the desired function or achieves the desired result, such as a condition that is within an acceptable predetermined tolerance or accuracy. For example, the term "approximately" refers to a condition that is within 10% of the stated condition. However, the term "approximately" does not exclude a condition that is exactly the stated condition.

As used herein, the term "extrudate" (e.g., extrudate 111) refers to the material being extruded through stirring tool 118.

Illustrative, non-exhaustive examples, which may or may not be claimed, of the subject matter according the present disclosure are provided below.

Figure 2:
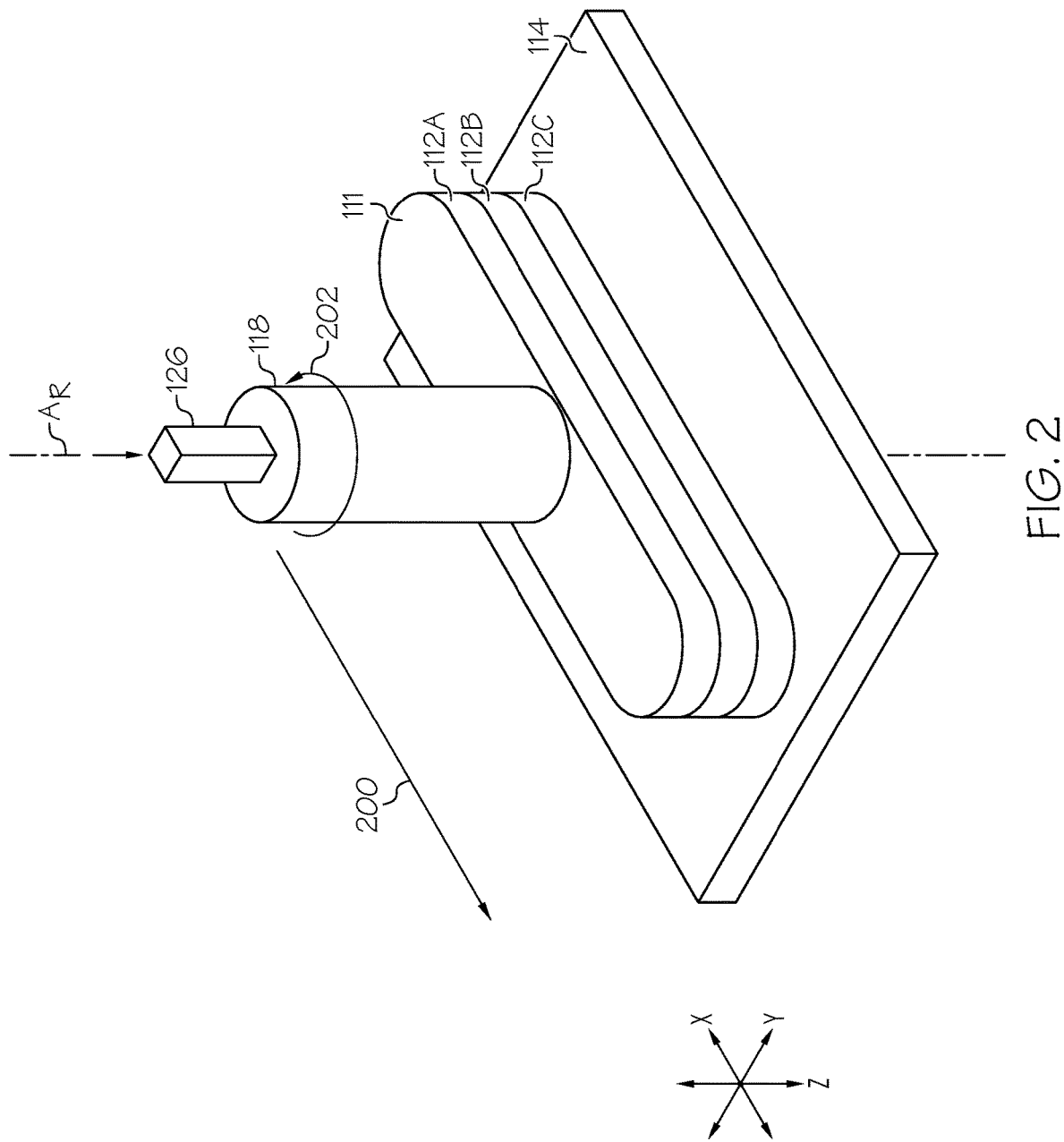
FIG. 2 is a schematic, perspective view of a sub-assembly of the additive manufacturing system of FIG. 1.
Figure 3:
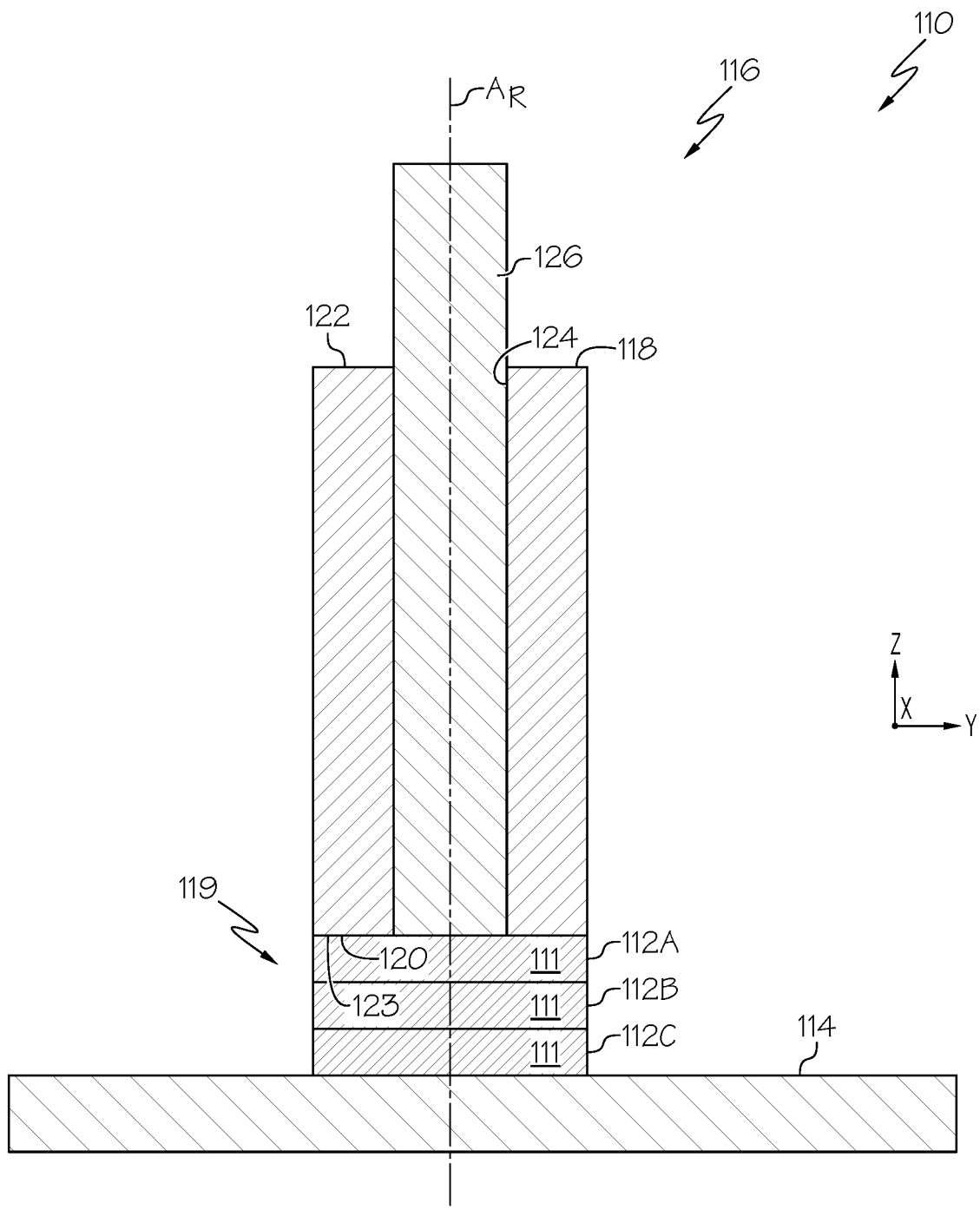
FIG. 3 is a schematic, elevational, sectional view of a sub-assembly of the additive manufacturing system of FIG. 1.

Referring generally to FIG. 1 and particularly to, e.g., FIGS. 2 and 3, an additive manufacturing system 110 for depositing an extrudate 111 onto a substrate 114 is disclosed. The additive manufacturing system 110 includes deposition head 116. Deposition head 116 includes a stirring tool 118. The stirring tool 118 is rotatable about an axis of rotation $A_R$. As shown in FIG. 3, the stirring tool 118 includes a tool distal end 120 and a tool proximal end 122, axially opposing the tool distal end 120 along the axis of rotation $A_R$. A tool shoulder 123 is formed at the tool distal end 120 of the stirring tool 118 and is positioned in physical (e.g., direct) contact with the surface of the substrate 114 or preceding layer 112A of the extrudate 111. The stirring tool 118 defines a bore 124. The bore 124 extends from the tool proximal end 122 to the tool distal end 120. The bore 124 is configured to receive feedstock 126. The feedstock 126 is biased toward the tool distal end 120.

The additive manufacturing system 110 provides a wide range of capabilities, including additive manufacturing, coating applications, component repair, metal joining, and custom metal alloy and metal matrix composite billet and part fabrication by depositing layers 112A, 112B, 112C of extrudate 111 onto the substrate 114.

The additive manufacturing system 110 is a solid-state process; meaning the feedstock 126 does not reach melting temperature during the deposition process. In the additive friction stir deposition process using additive manufacturing system 110, feedstock 126 is delivered through the bore 124 of the stirring tool 118. The stirring tool 118 rapidly rotates in the direction of directional arrow 202 and generates heat through dynamic contact friction at a tool-material interface. Heat is generated by dynamic contact friction between stirring tool 118 and build material. For the purpose of the present disclosure, the term "build material" refers to at least one of the feedstock 126, the extrudate 111, the substrate 114, or some combination thereof. Heat is dissipated by plastic deformation of the build material. Heat is transferred inside the build material by thermal conduction and thermal convection via material flow. Heated and softened, the feedstock 126 is fed through the stirring tool 126 as the extrudate 111 and bonds with the substrate 114 through plastic deformation at the interface.

As illustrated in FIG. 2, transverse motion of stirring tool 118, for example, in the direction of directional arrow 200, results in deposition of a single track, or a single layer, of extrudate 111. As best illustrated in FIG. 3, a three-dimensional article 119 is made by selectively adding subsequent layers 112A, 112B of extrudate 111 upon preceding layers 112B, 112C of extrudate 111 (e.g., three layers 112A, 112B, 112C of extrudate 111 are depicted in FIG. 2 and FIG. 3).

In one or more examples, tool distal end 120 of stirring tool 118 includes, or forms, a tool shoulder 123 that is positioned in physical (e.g., direct) contact with a surface of substrate 114 (e.g., during deposition of an initial layer 112C of extrudate 111) or a preceding layer 112A, 112B, 112C of extrudate 111 (e.g., during deposition of a subsequent layer 112A or 112B of extrudate 111). The bore 124 extends through the tool shoulder 123 formed at the tool distal end 120 of the stirring tool 118 and the feedstock 126 is biased toward the tool distal end 120 and is positioned in physical (e.g., direct) contact with the substrate 114 (e.g., during deposition of an initial layer 112C of extrudate 111) or a preceding layer 112A, 112B, 112C of the extrudate 111 (e.g., during deposition of a subsequent layer 112A or 112B of extrudate 111). Dynamic contact friction between the tool shoulder 123 formed at the tool distal end 120 of the stirring tool 118 and the substrate 114 or a preceding layer 112A, 112B, 112C of the extrudate 111 generates heat during rotation of the stirring tool 118. Dynamic contact friction between the feedstock 126 and the substrate 114 or a preceding layer 112A, 112B, 112C of extrudate 111 generates heat during rotation of the feedstock 126, which is co-rotated by rotation of the stirring tool 118.

Rapid rotation of the stirring tool 118 generates heat through dynamic contact friction between the stirring tool 118 and the substrate 114 (e.g., during deposition of an initial layer 112C of extrudate 111) or between the stirring tool 118 and a preceding layer 112A, 112B, 112C of extrudate 111 (e.g., during deposition of a subsequent layer 112A, 112B of extrudate 111).

Referring generally to FIG. 1 and particularly to, e.g., FIGS. 2 and 3, the feedstock 126 is received in the bore 124 such that rotation of the stirring tool 118 causes corresponding rotation of the feedstock 126. Rotation of the stirring tool 118 also rotates (e.g., co-rotates) the feedstock 126, located in the bore 24 of the stirring tool 118, about the axis of rotation $A_R$. Rapid rotation of the feedstock 126 generates heat through dynamic contact friction between the feedstock 126 and the substrate 114 (e.g., during deposition of the initial layer 112C of extrudate 111) or between feedstock 126 and a preceding layer 112A, 112B, 112C of extrudate 111 (e.g., during deposition of a subsequent layer 112A, 112B of extrudate 111).

In one or more examples, the feedstock 126 is biased toward the tool distal end 120 of the stirring tool 118 and into contact with the substrate 114 (e.g., during deposition of an initial layer 112C of extrudate 111) or a preceding layer 112A, 112B, 112C of extrudate 111 (e.g., during deposition of a subsequent layer 112A, 112B of extrudate 111) by a feed-stock force sufficient to inhibit rotation of the feedstock 126 relative to the stirring tool 118.

Referring generally to FIG. 1, the feedstock 126 includes metal or metal alloy. The feedstock 126 being metal or metal alloy enables the additive manufacturing system 110 to fabricate a three-dimensional article 119, formed of any one of various custom metals or metal alloys by depositing extrudate 111 onto the substrate 114.

In one or more examples, metal includes any one or more of a wide range of metals, such as, but not limited to, steel, aluminum, nickel, copper, magnesium, titanium, iron, and the like. In one or more examples, metal alloy includes any one or more of a wide range of metal alloys formed of iron, carbon, steel, manganese, nickel, chromium, molybdenum, boron, titanium, vanadium, tungsten, cobalt, niobium, and the like or combinations thereof.

In one or more examples, every layer 112A, 112B, 112C of extrudate 111 deposited on the substrate 114 is formed of the same feedstock material (e.g., the same metal or metal alloy). In such examples, a three-dimensional article 119, formed by the deposition process using additive manufacturing system 110, is homogeneous. In one or more examples, at least one layer 112A, 112B, 112C of extrudate 111 deposited on the substrate 114 is formed of a different feedstock material than at least one other layer 112A, 112B, 112C of extrudate 111 deposited on the substrate 114. In such examples, a three-dimensional article 119, formed by the deposition process using the additive manufacturing system 110, is inhomogeneous. An inhomogeneous composition will allow for a macroscopic anisotropic behavior with properties tailored to the required locations, and or anisotropic behavior of the component. For example, a layer of high thermal conductivity could be added to effectively dissipate the heat preferentially in one direction.

In one or more examples, the feedstock 126 is a solid material, such as a solid rod of metal or a solid rod of metal alloy. In one or more examples, the feedstock 126 is a powdered material, such powdered metal or powdered metal alloy.

Although the illustrative examples of the three-dimensional article 119 formed from layers 112A, 112B, 112C of extrudate 111 deposited on the substrate 114 depict a substantially linear, in plain view, three-dimensional article 119, which is formed from substantially linear, in plain view, layers 112A, 112B, 112C of extrudate 111, in other examples, the three-dimensional article 119 or one or more layers 112A, 112B, 112C of extrudate 111 has a non-linear or complex shape, in plain view. It should be appreciated that in one or more examples, the movement path of deposition head 116 for deposition of any given layer 112A, 112B, 112C of extrudate 111 depends on various factors, such as the geometry of a portion of the three-dimensional article 119 formed by the respective layers of extrudate 111.

As illustrated in FIGS. 2 and 3, in one or more examples, each layer 112A, 112B, 112C of extrudate 111 is deposited by moving deposition head 116 along an approximately linear movement path and, thus, forming a linear layer of extrudate 111.

In one or more examples, one or more layers 112A, 112B, 112C of extrudate 111 are deposited by moving deposition head 116 along a non-linear movement path and, thus, forming a non-linear layers 112A, 112B, 112C of extrudate 111. Linear or nonlinear motions may be required to have different shapes directions. For example, a linear motion can be utilized for the fabrication of a gear with the teeth on the longitudinal direction, a nonlinear motion will be necessary to fabricate a screw actuator.

Referring generally to FIG. 1, the additive manufacturing system 110 further includes a number of control devices 140 including a control unit 142 and a stirring-tool force applicator 144 configured to urge the deposition head 116 against the substrate 114. The stirring-tool force applicator 144 enables selective control of a position of the stirring tool 118 relative to the substrate 114 or relative to a preceding layer 112A, 112B, 112C during deposition of extrudate 111.

The stirring-tool force applicator 144 may be any one of various types of force application devices, linear motion control devices, or actuators suitable to selectively apply a stirring-tool force. The stirring tool 118 produces two types of forces, one rotational frictional in nature that generates heat, one pressure on the working piece and a translation force that moves the tool through the component, the balance of those forces depends on the configuration and parameters of the deposition. As used herein, a stirring tool force includes the torque and the vertical load applied by the tool. The stirring-tool force is selectively applied to stirring tool 118 and the stirring tool 118 is selectively positioned relative to the substrate 114 or relative to a preceding layer 112A, 112B, 112C of extrudate 111, such as along axis of rotation $A_R$. In one or more examples, the stirring-tool force applicator 144 is operatively coupled with the stirring tool 118. The stirring-tool force applicator 144 is configured to urge the stirring tool 118 against the substrate 114 or a preceding layer 112A, 112B, 112C of extrudate 111, such that the tool shoulder 123 of the tool distal end 120 is in direct, physical contact with the substrate 114 or the preceding layer 112A, 112B, 112C of extrudate 111 with a force sufficient to generate heat through dynamic contact friction when the stirring tool 118 rotates.

In one or more examples, the stirring-tool force applicator 144 is a linear actuator. In one or more examples, the stirring-tool force applicator 144 includes at least one of a pneumatic linear actuator, a hydraulic linear actuator, or a mechanical linear actuator. Use of at least one of the pneumatic linear actuator, the hydraulic linear actuator, or the mechanical linear actuator as stirring-tool force applicator 144 provides a simple, effective, and repeatable means of selectively positioning the stirring tool 118 relative to the substrate 114.

In one or more examples, the control unit 142 is communicatively coupled with stirring-tool force applicator 144. The control unit 142 is configured to provide operating instructions to the stirring-tool force applicator 144 for selective positioning of the stirring tool 118 during deposition of extrudate 111.

Referring generally to FIG. 1, control devices 140 further includes a stirring-tool rotation device 146, configured to rotate the stirring tool 118 about the axis of rotation $A_R$ while the stirring-tool force applicator 144 urges the deposition head 116 against the substrate 114. The stirring-tool rotation device 146 enables rapid rotation of the stirring tool 118 about the axis of rotation $A_R$ during deposition of extrudate 111.

The stirring-tool rotation device 146 may be any one of various types of rotational force application devices, rotational motion control devices, or actuators suitable to rotate the stirring tool 118 about the axis of rotation $A_R$. In one or more examples, the stirring-tool rotation device 146 is operatively coupled with the stirring tool 118. With the tool shoulder 123 of the tool distal end 120 of the stirring tool 118 in contact with the substrate 114 (e.g., during deposition of an initial layer 112C of extrudate 111) or a preceding layer 112A, 112B, 112C of extrudate 111 (e.g., during deposition of a subsequent layer 112A, 112B of extrudate 111), the stirring-tool rotation device 146 is configured to rotate the stirring tool 118 at a rotational speed, sufficient to generate heat through dynamic contact friction at the deposition interface.

In one or more examples, the stirring-tool rotation device 146 is a rotary actuator. In one or more examples, the stirring-tool rotation device 146 includes at least one of a pneumatic rotary actuator, a hydraulic rotary actuator, or a mechanical rotary actuator. Use of at least one of the pneumatic rotary actuator, the hydraulic rotary actuator, or the mechanical rotary actuator as the stirring-tool rotation device 146 provides a simple, effective, and repeatable means of rapidly rotating the stirring tool 118.

In one or more examples, the control unit 142 is communicatively coupled with the stirring-tool rotation device 146. The control unit 142 is configured to provide operating instructions to the stirring-tool rotation device 146 for rotation of the stirring tool 118 during deposition of extrudate 111.

Referring generally to FIG. 1, control devices 140 further includes a feed-stock force applicator 148 that biases feedstock 126 toward tool distal end 120. The feed-stock force applicator 148 urges the feedstock 126 into contact with the substrate 114 or a preceding layer 112A, 112B, 112C of extrudate 111 during deposition of extrudate 111.

The feed-stock force applicator 148 may be any one of various types of force application devices, linear motion control devices, or actuators suitable to selectively apply the feed-stock force to the feedstock 126 and position the feedstock 126 into contact with the substrate 114 or a preceding layer 112A, 112B, 112C of extrudate 111, such as along the axis of rotation $A_R$. In one or more examples, the feed-stock force applicator 148 is operatively coupled with the feedstock 126. The feed-stock force applicator 148 is configured to urge the feedstock 126 against the substrate 114 (or a preceding layer 112A, 112B, 112C of extrudate 111) such that the feedstock 126, positioned at, or protruding from, the tool distal end 120 of the stirring tool 118 is in direct, physical contact with the substrate 114 (or the preceding layer 112A, 112B, 112C of extrudate 111) with a force sufficient to generate heat through dynamic contact friction when the feedstock 126 rotates (e.g., when the feedstock 126 co-rotates with the stirring tool 118).

In one or more examples, the feed-stock force applicator 148 is a linear actuator. In one or more examples, the feed-stock force applicator 148 includes at least one of a pneumatic linear actuator, a hydraulic linear actuator, or a mechanical linear actuator. Use of at least one of the pneumatic linear actuator, the hydraulic linear actuator, or the mechanical linear actuator as the feed-stock force applicator 148 provides a simple, effective, and repeatable means of selectively urging the feedstock 126 into contact with the substrate 114 (or a preceding layer 112A, 112B, 112C of extrudate 111).

In one or more examples, the control unit 142 is communicatively coupled with the feed-stock force applicator 148. The control unit 142 is configured to provide operating instructions to the feed-stock force applicator 148 for urging the feedstock 126 toward the tool distal end 120 of the stirring tool 118 (e.g., outward from bore 124) during deposition of extrudate 111.

Referring generally to FIG. 1, the additive manufacturing system 110 further includes a carriage 150 connected to the deposition head 116. The carriage 150 moves the deposition head 116 relative to the substrate 114. The carriage 150 enables the deposition head 116 to move relative to the substrate 114 (or a preceding layer 112A, 112B, 112C of extrudate 111) during deposition of a subsequent layer 112A, 112B, 112C of extrudate 111 independent of the substrate 114.

The carriage 150 may be any one or various types of motion control devices or tool manipulators. In one or more examples, the carriage 150 is a programmable robotic manipulator, such as a robotic arm, configured to automatically move the deposition head 116 in three-dimensional space. In such examples, the deposition head 116 takes the form of an end effector, connected to a working end of the robotic arm.

In one or more examples, the control unit 142 is communicatively coupled with the carriage 150. The control unit 142 is configured to provide operating instructions to the carriage 150 for selective positioning and moving of the deposition head 116 during deposition of extrudate 111.

In one or more examples, additionally or alternatively, the additive manufacturing system 110 also includes a second carriage 250 connected to the substrate 114. The second carriage 250 moves the substrate 114 relative to the deposition head 116. The second carriage 250 enables the substrate 114 to move relative to the deposition head 116 during deposition of a subsequent layer 112A, 112B, 112C of extrudate 111 independent of the deposition head 116. The second carriage 250 may be any one or various types of motion control devices or tool manipulators. In one or more examples, the second carriage 250 is a programmable robotic manipulator, such as a robotic arm configured to automatically move the substrate 114 in three-dimensional space. In one or more examples, the control unit 142 is communicatively coupled with the second carriage 250. The control unit 142 is configured to provide operating instructions to the second carriage 250 for selective positioning and moving the deposition head 116 during deposition of extrudate 111.

Referring generally to FIGS. 4A and 4B, one general, non-limiting example of an article 119 that can be manufactured using the additive manufacturing system 110 is an aircraft component 460. One specific, non-limiting example of an aircraft component 460 that can be manufactured using the additive manufacturing system 110 is a gear 430 having gear teeth 432.

As shown in FIG. 4A, a preform 400 having the example shape shown in FIG. 4A is provided (e.g., machined from a blank). The preform 400 includes a high-toughness material and has a longitudinal central axis 402. As shown, the preform 400 includes preform gear teeth 403, each including a first preform tooth face 403A and a second preform tooth face 403B.

In some examples, the high-toughness material of the preform 400 may include a high-toughness alloy such as steel, aluminum, a titanium alloy, or titanium with boron particles diffused on the titanium. An example composition (i.e., a first composition) of the preform 400 is Ti-6Al-4V.

An extrudate 111 is applied onto the outer surfaces 404 of the preform 400, including on the first preform tooth face 403A and the second preform tooth face 403B, using the additive manufacturing system 110 of FIG. 1 to form an intermediate article 420. The preform 400 includes a first composition. The extrudate 111 includes a wear-resistant material 410 (i.e., a second composition that may be different from the first composition). The wear-resistant material 410 may include a gamma alloy, an aluminum material metal-matrix composite, an aluminum alloy, or an aluminum alloy with alumina of silicon carbide spherical particles for wear resistance. In some examples, the wear-resistant material 410 may include a metal-matrix composite, the composition of which may be graded to achieve better overall performance.

The intermediate article 420 is machined to remove portions 438 of the wear-resistant material 410 to form a gear 430 including a gear core 431 and a plurality of gear teeth 432 protruding from the gear core 431. More specifically, as shown in FIG. 4A, the intermediate article having the wear-resistant material 410 on the first preform tooth face 403A and the second preform tooth face 403B is machined to remove portions of the wear-resistant material 410 on the first preform tooth face 403A and the second preform tooth face 403B to form the machined gear teeth 432, each machined gear teeth 432 comprising a first machined tooth face 432A, a second machined tooth face 432B, and a third machined tooth face 432C. Referring to FIG. 4A, the first machined tooth face 432A, the second machined tooth face 432B, and the third machined tooth face 432C are nonparallel to the first preform tooth face 403A and the second preform tooth face 403B. A wear-resistant layer 440 is disposed on at least a portion 446 of each gear tooth 432 of the plurality of gear teeth 432. An intermixed interface layer 450 is defined between the gear core 431 and the wear-resistant layer 440 disposed on the gear core 431. The intermixed interface layer 450 provides bonding between the wear-resistant material 410 and the gear core 431. Portions 448 of the gear core 431 and the wear-resistant material 410 are plasticized to yield the intermixed interface layer 450. In some examples, the intermixed interface layer 450 includes refined grain microstructures that are sized substantially at the nanometer and micrometer level. This includes nano-grains (<100 nm), Ultra Fine Grains or UFG (100 nm to 500 nm) and micro-grains (>0.5 um).

As shown in FIG. 4B, a plurality of manufactured gears 435 may be manufactured from a rod-shaped structure 436 in which individual gears 430a, 430b, 430c, 430d, etc. can be cut like slices of bread along the longitudinal central axis 402 of the preform 400 to provide a plurality of manufactured gears 435.

Referring generally to FIGS. 5A and 5B, another example of an article 119 that can be manufactured using the additive manufacturing system 110 is another aircraft component 534. The aircraft component 534 is in the form of a gear having gear teeth 532.

As shown in FIG. 5A, a preform 500 having a circumferential surface 562 is provided. In some examples, extrudate 111, which can first be a metallic material 564, is deposited by additive friction stir deposition onto a metallic substrate 563 of the circumferential surface 562 of the cylindrical body 560 to yield a first intermediate article 510. In some examples, the metallic material 564 and the metallic substrate 563 are compositionally substantially the same. The preform 500 can include a high-toughness material, and may define a longitudinal central axis 502.

In some examples, the high-toughness material of the preform 500 may be a high-toughness alloy such as steel, aluminum, a titanium alloy, or titanium with boron particles diffused on the titanium. An example composition of the preform 500 is Ti-6Al-4V. In another example, Ti5321 is used in an Alfa+Beta thermo mechanical heat treatment. In yet another example, a high toughness aluminum alloy, such as Al7475-T7351, can be used.

Then, additional extrudate 111 (e.g., a wear-resistant material 506) is applied onto the outer surfaces 504 of the preform 500 using the additive manufacturing system 110 of FIG. 1 to form a second intermediate article 520. It should be apparent that the depositing by additive friction stir deposition of the metallic material 564 on the metallic substrate 563 of the circumferential surface 562 of the cylindrical body 560 to yield the preform 500 is prior to the depositing by additive friction stir deposition of the wear-resistant material 506 onto the preform 500. In this example, the additional extrudate 111 includes a wear-resistant material 506. The wear-resistant material 506 may include a gamma alloy, an aluminum material metal-matrix composite, an aluminum alloy, or an aluminum alloy with alumina of silicon carbide spherical particles for wear resistance. In some examples, the wear-resistant material 506 may include a metal-matrix composite, the composition of which may be graded to achieve better overall performance. In this case, the preform 500 may be a material exhibiting high toughness, and a higher ceramic content material would be closer to wear surfaces for improved wear resistance via increased hardness.

The intermediate article 520 is machined to remove portions 538 of the wear-resistant material 506 from the intermediate article 520 to form a gear 530 having a gear core 531 (i.e., the cylindrical body 560) and a plurality of gear teeth 532 protruding from the gear core 531. A wear-resistant layer 540 is disposed on at least a portion 536 of each gear tooth 532 of the plurality of gear teeth 532. An intermixed interface layer 550 is defined between the gear core 531 and the wear-resistant layer 540 disposed on the gear core 531. Portions 508 of the preform 500 and the wear-resistant material 506 are plasticized to yield the intermixed interface layer 550. In some examples, the intermixed interface layer 550 includes refined grain microstructures that are sized substantially at the nanometer and micrometer level. This includes nano-grains (<100 nm), Ultra Fine Grains or UFG (100 nm to 500 nm) and micro-grains (>0.5 um).

As shown in FIG. 5B, a plurality of gears 535 may be manufactured from a rod-shaped structure 537 in which individual gears 530a, 530b, 530c, 530d, etc. can be cut like slices of bread along the longitudinal central axis 502 of the preform 500 to form a plurality of manufactured gears 535.

Figure 6A:
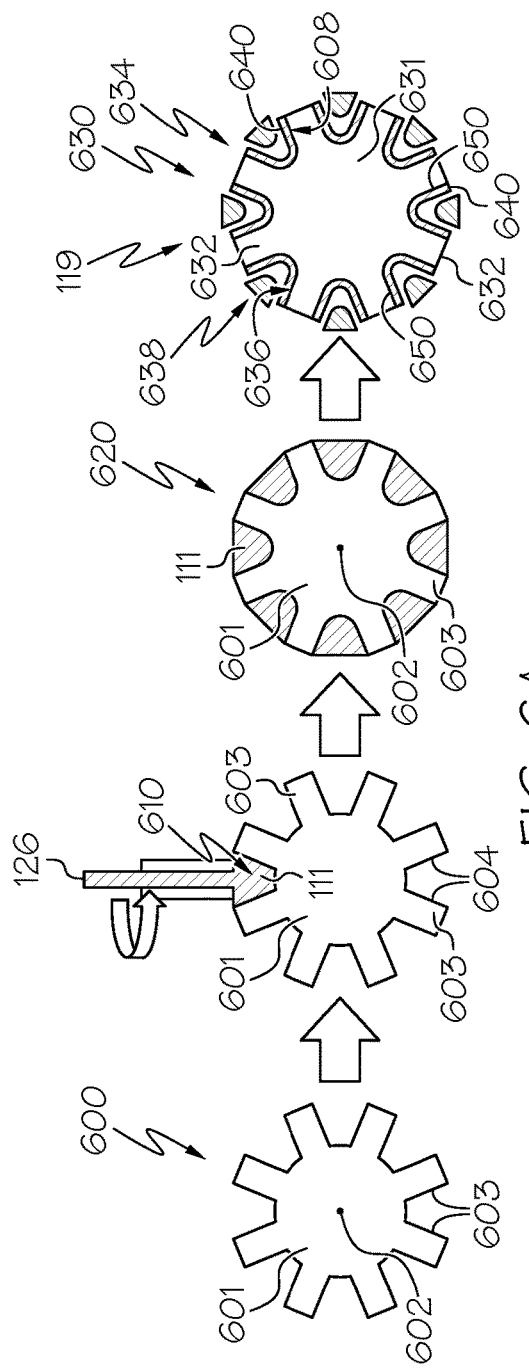
FIGS. 6A and 6B are each a schematic, elevational, sectional view of an example article in the form of a gear manufactured using the additive manufacturing system of FIG. 1, according to an example.
Figure 6B:
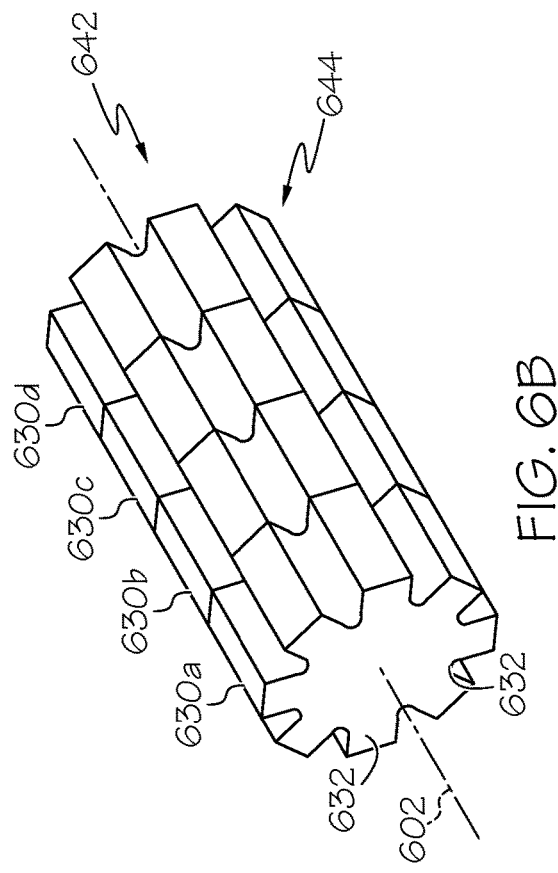

Referring generally to FIGS. 6A and 6B, another example of an article 119 manufactured using the additive manufacturing system 110 is another aircraft component 634, specifically, a gear 630 having gear teeth 632.

As shown in FIG. 6A, a preform 600 includes a body portion 601 and partially-formed gear teeth 603 protruding from the body portion 601. The preform 600 can be formed from a high-toughness material, and may define a longitudinal central axis 602. In some examples, the high-toughness material of the preform 600 may be a high-toughness alloy such as steel, aluminum, a titanium alloy, or titanium with boron particles diffused on the titanium. An example composition of the preform 600 includes Ti-6Al-4V.

Extrudate 111 is applied to the outer surfaces 604 of the preform 600 using the additive manufacturing system 110 of FIG. 1 to form an intermediate article 620. The extrudate is (or includes) a wear-resistant material 610. The wear-resistant material 610 may include a gamma alloy, an aluminum material metal-matrix composite, an aluminum alloy, or an aluminum alloy with alumina of silicon carbide spherical particles for wear resistance. In some examples, the wear-resistant material 610 may include a metal-matrix composite, the composition of which may be graded to achieve better overall performance. For example, the preform 600 may be a material exhibiting high toughness, and the wear-resistant material 610 may have a higher ceramic content and may be positioned closer to the wear surfaces for improved wear resistance by way of increased hardness. It should be apparent that the wear-resistant material 610 is deposited on the partially-formed gear teeth 603 of the preform 600.

The intermediate article 620 is machined to remove portions 638 of the wear-resistant material 610 to form a gear 630 including a gear core 631 (i.e., the body portion 601) and a plurality of gear teeth 632 protruding from the gear core 631. A wear-resistant layer 640 is disposed on at least a portion 636 of each gear tooth 632 of the plurality of gear teeth 632. An intermixed interface layer 650 is defined between the gear core 631 and the wear-resistant layer 640 disposed on the gear core 631. Portions 608 of the gear core 631 and the wear-resistant material 610 are plasticized to yield the intermixed interface layer 650. In some examples, the intermixed interface layer 650 includes refined grain microstructures that are sized substantially at the nanometer and micrometer level. This includes nano-grains (<100 nm), Ultra Fine Grains or UFG (100 nm to 500 nm) and micro-grains (>0.5 um).

As shown in FIG. 6B, a plurality of gears 642 may be manufactured from a rod-shaped structure 644 in which individual gears 630a, 630b, 630c, 630d, etc. can be cut like slices of bread along the longitudinal central axis 602 of the preform 600 to provide a plurality of manufactured gears 642.

Referring generally to FIG. 7 and particularly to, e.g., FIGS. 1 and 3, a method 700 of depositing extrudate 111 onto a substrate 114 to manufacture an article 119 is disclosed. The method 700 includes (Block 702) providing a preform. The method 700 also includes (Block 704) depositing by additive friction stir deposition a wear-resistant material on a surface of the preform to form an intermediate article. The preform includes a first composition and the wear-resistant material includes a second composition that may be different from the first composition. For example, the second composition may be significantly functionally different from the first composition. The method 700 further includes (Block 706) machining the intermediate article to remove therefrom at least a portion of the wear-resistant material. The result is an article manufactured by the method 700 of FIG. 7. The manufactured article may have a lighter weight for a given power/load capacity, better wear and tear resistance, and better corrosion resistance.

In some examples, the first composition includes at least one of an aluminum alloy, a titanium alloy, and steel.

In some examples, the first composition includes Ti-6Al-4V.

In some examples, the wear-resistant material includes a metal-matrix composite. In some examples, the metal-matrix composite includes a select one of an aluminum alloy with alumina particles, an aluminum alloy with titanium diboride particles, and an aluminum matrix with ceramic reinforcement.

In some examples, the depositing by additive friction stir deposition the wear-resistant material includes depositing a substantially-uniform wear-resistant material on the surface of the preform.

In some examples, the depositing by additive friction stir deposition the wear-resistant material includes depositing a graded wear-resistant material on the surface of the preform.

In some examples, the depositing the graded wear-resistant material includes depositing a first wear-resistant material on the surface of the preform, and depositing a second wear-resistant material on the first wear-resistant material.

In some examples, a starting material (e.g., a blank) is machined to yield the preform.

In some examples, the preform includes partially-formed gear teeth, and the wear-resistant material is deposited on the partially-formed gear teeth.

In some examples, the preform includes a generally cylindrical body, and the surface is a circumferential surface of the generally cylindrical body.

In some examples, the preform is in a form of a gear having gear teeth, and the wear-resistant material forms a protective coating layer on the gear teeth.

In some examples, the method further includes, prior to the depositing by additive friction stir deposition the wear-resistant material, depositing by additive friction stir deposition a metallic material on a metallic substrate to yield the preform. In some examples, the metallic material and the metallic substrate are compositionally substantially the same.

In some examples, the depositing by additive friction stir deposition the wear-resistant material includes plasticizing portions of the preform and the wear-resistant material to yield an intermixed interface layer between the preform and the wear-resistant material. In some examples, the intermixed interface layer includes refined grain microstructures that are sized substantially at the nanometer and micrometer level. This includes nano-grains (<100 nm), Ultra Fine Grains or UFG (100 nm to 500 nm) and micro-grains (>0.5 um).

In some examples, an aircraft component is manufactured according to the method 700 of FIG. 7.

In some examples, a gear is manufactured according to the method 700 of FIG. 7.

Referring generally to FIG. 8 and particularly to, e.g., FIGS. 1 and 3, a method 800 of depositing extrudate 111 onto a substrate 114 to manufacture a gear including gear teeth from a preform including a metallic material is disclosed. The method 800 includes (Block 802) depositing by additive friction stir deposition a metal-matrix composite on the metallic material of the preform to form an intermediate article. The method 800 also includes (Block 804) machining the intermediate article to remove at least a portion of the metal-matrix composite deposited on the preform. The result is a gear including gear teeth manufactured by the method 800 of FIG. 8. The manufactured gear has a lighter weight for a given power/load capacity, better wear and tear resistance, and better corrosion resistance.

In some examples, the metal-matrix composite deposited on the preform and remaining after the machining forms a wear-resistant protective coating layer on the gear teeth.

In some examples, the metallic material includes at least one of an aluminum alloy, a titanium alloy, and steel.

In some examples, the metal-matrix composite includes a select one of an aluminum alloy with alumina particles, an aluminum alloy with titanium diboride particles, and an aluminum matrix with ceramic reinforcement.

In some examples, the depositing by additive friction stir deposition the metal-matrix composite includes plasticizing portions of the preform and the metal-matrix composite to yield an intermixed interface layer between the preform and the metal-matrix composite.

In some examples, the machining yields a machined intermediate article, and the method further includes cutting the machined intermediate article across a longitudinal central axis of the preform to form a plurality of manufactured gears.

Figure 10:
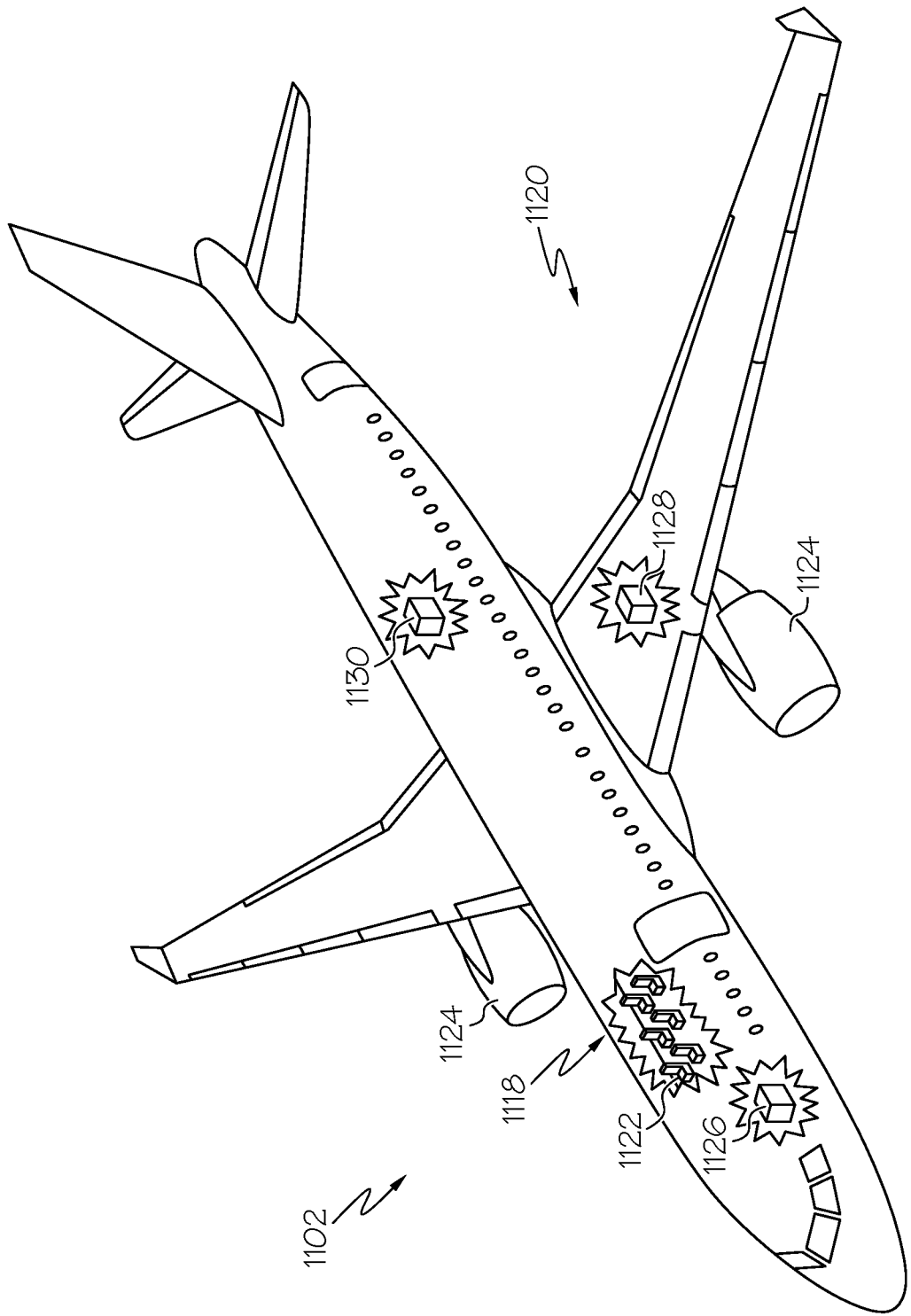
FIG. 10 is a schematic illustration of an aircraft.

Examples of the present disclosure may be described in the context of aircraft manufacturing and service method 1100 as shown in FIG. 9 and aircraft 1102 as shown in FIG. 10. During pre-production, illustrative method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the apparatus(es), method(s), or combination thereof may be utilized during production stages (Blocks 1108 and 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (Block 1114) and/or during maintenance and service (Block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for manufacturing a gear from a preform, the preform comprising preform gear teeth formed from a high-toughness metallic material, each preform gear teeth comprising a first preform tooth face and a second preform tooth face, the method comprising:
- depositing by additive friction stir deposition a metal-matrix composite on the first preform tooth face and the second preform tooth face of the preform gear teeth of the preform to provide to provide an intermediate article, wherein the metal-matrix composite comprises a select one of an aluminum alloy with alumina particles, an aluminum alloy with titanium diboride particles, and an aluminum matrix with ceramic reinforcement, wherein the preform comprises a member selected from a group consisting of aluminum alloy, titanium alloy, and steel, wherein an intermixed interface layer is defined between the preform and the metal-matrix composite disposed on the preform after the depositing; and
- machining the intermediate article to remove at least a portion of the metal-matrix composite deposited on the first preform tooth face and the second preform tooth face of the gear teeth of the preform to form machined gear teeth, each machined gear teeth comprising a first machined tooth face and a second machined tooth face, wherein the first machined tooth face and a second machined tooth face are nonparallel to the first preform tooth face and a second preform tooth face.

2. The method of claim 1 wherein the depositing by additive friction stir deposition the metal-matrix composite comprises plasticizing portions of the preform and the metal-matrix composite to yield the intermixed interface layer between the preform and the metal-matrix composite.

3. The method of claim 1 further comprising:
- cutting the machined intermediate article across a longitudinal central axis of the preform to provide a plurality of manufactured gears.

4. The method of claim 1, wherein the preform comprises a titanium alloy and the metal-matrix composite comprises an aluminum material metal-matrix composite.

5. The method of claim 1, wherein the metal-matrix composite comprises an aluminum alloy with alumina of silicon carbide spherical particles.

6. The method of claim 1, wherein the preform comprises Ti-6Al-4V.

7. The method of claim 1, wherein the metal-matrix composite comprises an aluminum alloy with alumina of silicon carbide spherical particles.

8. The method of claim 1, wherein the preform comprises Ti-6Al-4V.

9. A method for manufacturing a gear from a preform, the preform comprising preform gear teeth formed from a high-toughness metallic material, each preform gear teeth comprising a first preform tooth face and a second preform tooth face, the method comprising:
- depositing by additive friction stir deposition a wear-resistant material on the first preform tooth face and the second preform tooth face of the preform gear teeth of the preform to provide an intermediate article; and
- machining the intermediate article to remove at least a portion of the wear-resistant material deposited on the first preform tooth face and the second preform tooth face of the gear teeth of the preform to form machined gear teeth, each machined gear teeth comprising a first machined tooth face and a second machined tooth face, wherein the first machined tooth face and a second machined tooth face are nonparallel to the first preform tooth face and a second preform tooth face.

10. The method of claim 9, wherein the high-toughness metallic material comprises at least one of an aluminum alloy, a titanium alloy, and steel.

11. The method of claim 9, wherein the wear-resistant material comprises a metal-matrix composite.

12. The method of claim 11, wherein the metal-matrix composite comprises a select one of an aluminum alloy with alumina particles, an aluminum alloy with titanium diboride particles, and an aluminum matrix with ceramic reinforcement.

13. The method of claim 9, further comprising machining a starting material to yield the preform.

14. The method of claim 9, the preform gear teeth are partially-formed gear teeth, and wherein the wear-resistant material is deposited on the partially-formed gear teeth.

15. The method of claim 9, wherein the wear-resistant material forms a protective coating layer on the preform gear teeth.

16. The method of claim 9, further comprising, prior to the depositing by additive friction stir deposition, depositing by additive friction stir deposition a high-toughness metallic material on a metallic substrate to yield the preform gear teeth.

17. The method of claim 9, wherein the depositing by additive friction stir deposition the wear-resistant material comprises plasticizing portions of the preform gear teeth and the wear-resistant material to yield the intermixed interface layer between the preform gear teeth and the wear-resistant material.

18. The method of claim 9, wherein the machining yields a machined intermediate article, the method further comprising:
- cutting the machined intermediate article across a longitudinal central axis of the preform to provide a plurality of manufactured gears.

19. The method of claim 9, wherein the preform comprises Ti-6Al-4V.

* * * * *